United States Patent [19]

Viaud

[11] Patent Number: 4,759,278

[45] Date of Patent: Jul. 26, 1988

[54] MACHINE FOR FORMING CYLINDRICAL BALES OF CROP

[75] Inventor: Jean Viaud, Sarrequemines, France

[73] Assignee: Deere & Company, Moline, Ill.

[21] Appl. No.: 20,839

[22] Filed: Mar. 2, 1987

[30] Foreign Application Priority Data

Mar. 5, 1986 [GB] United Kingdom ............... 8605465

[51] Int. Cl.⁴ ........................... B30B 5/06; B30B 9/30
[52] U.S. Cl. ......................................... 100/88; 56/341
[58] Field of Search .................. 100/88; 56/341, 343, 56/344

[56] References Cited

U.S. PATENT DOCUMENTS

| | | | |
|---|---|---|---|
| 4,240,339 | 12/1980 | Simonis | 100/88 |
| 4,252,057 | 2/1981 | Gaeddert et al. | 100/88 |
| 4,258,619 | 3/1981 | Gaeddert | 100/88 |
| 4,280,320 | 7/1981 | Eggers | 100/88 X |
| 4,336,750 | 6/1982 | White et al. | 100/88 |
| 4,343,141 | 8/1982 | Oellig et al. | 100/88 X |
| 4,391,187 | 7/1983 | Koning et al. | 100/88 |
| 4,399,746 | 8/1983 | Viaud | 100/88 |
| 4,402,259 | 9/1983 | Viaud | 100/88 X |
| 4,545,298 | 10/1985 | Viaud | 100/88 |

FOREIGN PATENT DOCUMENTS

| | | |
|---|---|---|
| 0037155 | 7/1981 | European Pat. Off. |
| 2538164 | 1/1976 | Fed. Rep. of Germany |
| 2808593 | 9/1978 | Fed. Rep. of Germany |

*Primary Examiner*—John Petrakes
*Assistant Examiner*—Katherine Matecki

[57] ABSTRACT

A baling machine has belts which define a chamber in which a bale is formed. The belts are trained over rolls including belt take-up rolls mounted on a pair of pivoted arms moved by a piston and cylinder units connected thereto at first ends and connected at second other ends to a gate of the machine.

In order to have the choice of producing a bale with a soft core each arm has a plurality of connection points one of which is close to the arm pivot and a geometric line through the axis of each unit will pass near the arm pivot so that tension applied by the unit to the belts during formation of the bale core is insignificant. The angle between the axis of each unit and a line joining the connection point of the unit to the gate and the arm pivot is zero to seven degrees, and desirably three to four degrees.

4 Claims, 2 Drawing Sheets

MACHINE FOR FORMING CYLINDRICAL BALES OF CROP

BACKGROUND OF THE INVENTION

The present invention relates to a baling machine for forming cylindrical bales of crop.

Machines, towed by a tractor, for forming large cylindrical bales of hay (so called "round balers") are well-known. As the machine advances, the crop is removed from a windrow by a pickup mechanism and delivered rearwardly to a baling chamber where it is rolled into a bale between oppositely moving belt runs, the growing bale rotating about a horizontal axis and the baling chamber expanding with the bale. The belts are trained over rolls which extend laterally of the machine. Some of these rolls are mounted on a pivoted arm at either side of the machine which swings and thereby accommodates the increasing size of the bale by reducing the take-up of the belts.

In one type of round baler currently marketed, in order to produce a dense bale the arm is loaded against its swinging movement by a piston and cylinder unit which is also connected to the gate for loading it against opening during baling and for opening it on completion of a bale. A uniformly dense bale is normally required.

However, in some conditions of harvesting the hay cannot be dried sufficiently before baling, and then it is desirable to produce a bale which has a "soft" core and a high density outer shell. To achieve this the hydraulic pressure in the piston and cylinder unit could be reduced to lessen the load on the pivoted take-up roll arm, but the unit would then not perform its second function of preventing opening of the gate during baling.

SUMMARY OF THE INVENTION

According to the present invention there is provided an improvement to round balers of the type utilizing a piston and cylinder unit for effecting belt tension and for operating a bale discharge gate.

An object of the present invention is to provide a baler of the above-described type which can be used to make either a bale of uniform density or a bale with a soft core and dense outer shell by means of an arrangement which is simple and easy to work.

A more specific object of the present invention is to provide a baling machine for forming cylindrical bales of crop which is of a type including a piston and cylinder unit having opposite ends respectively pivotally connected to a bale discharge gate and to a belt take-up or tensioning arm, which is pivotally mounted to the machine frame and with the connection of the unit to the arm being selectively adjustable to one position wherein a geometric line along the longitudinal axis of the unit is sufficiently close to the pivot of the arm that the tension applied to the belt or belts by the unit during formation of the bale core is insignificant.

Yet, a more specific object of the invention is to provide a baling machine as described in the previous object wherein when the unit is connected to said one position, at start-up of baling the longitudinal axis of the unit is at an angle of from zero to seven degrees to a geometric line joining the said pivot connections of the unit to the gate and of the arm to the machine frame with the angle preferably being in the range of from two to four degrees and particularly from three to four degrees.

These and other objects will become apparent from a reading of the ensuing description together with the appended drawings.

DESCRIPTION OF THE PREFERRED EMBODIMENT

Figure 1:
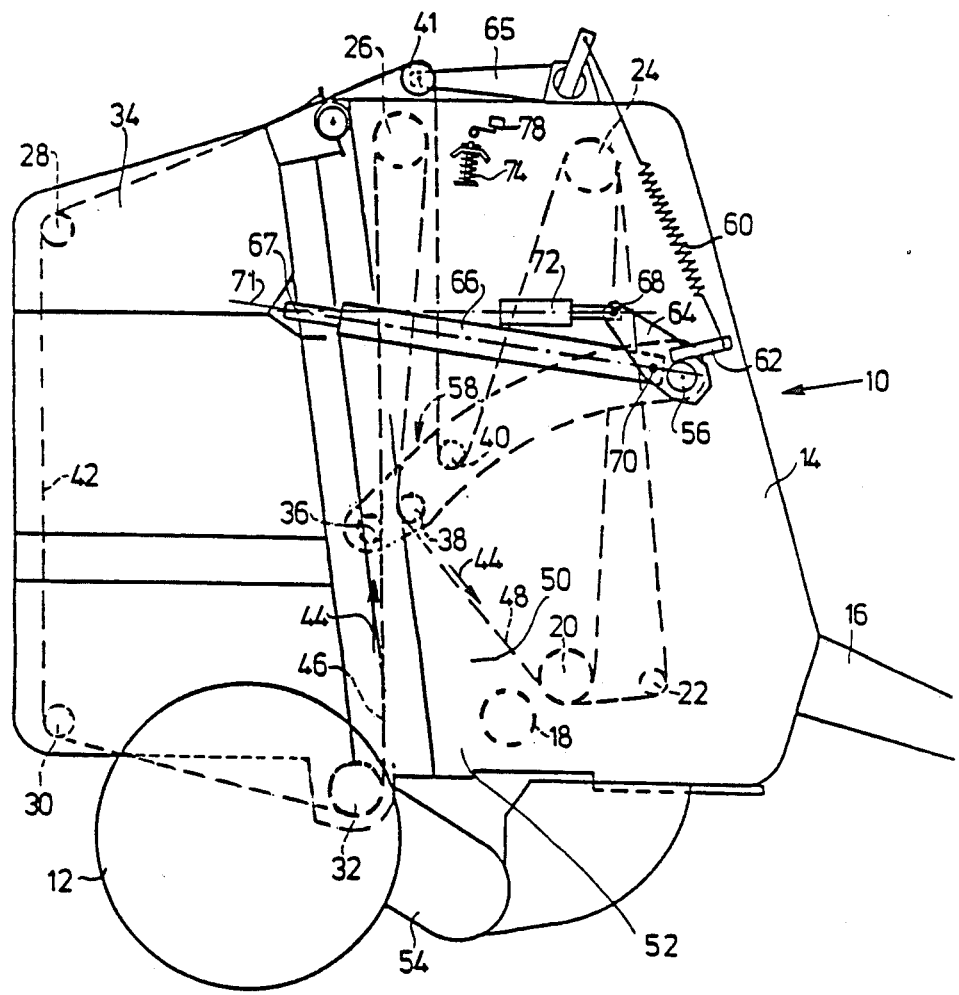
FIG. 1 shows a right-hand side (considered when facing in the direction of travel) of a machine for forming large cylindrical bales of hay, in its condition before baling has started.

In the drawings, the machine includes a main frame 10 mounted on a pair of wheels of which only the right-hand wheel 12 is shown. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A plurality of lateral rolls extend over the width of the machine. One set of rolls 18, 20, 22, 24, 26 is journalled in the sidewalls 14, while another set consisting of rolls 28, 30, 32 is journalled in a swingable gate 34. There is also a pair of chamber restricting rolls 36, 38 and two belt take-up rolls 40, 41.

Six rubber belts 42 are trained side-by-side over the rolls, with the exception of the roll 18 which acts as a stripper roll, to provide the configuration shown and they move in the direction indicated by arrows 44, the stripper roll 18 being driven anticlockwise as viewed in the figures. However, alternate belts only are trained over the lower foremost roll 22, while the remaining belts bypass this roll, to provide a staggered array which is of no significance in relation to the present invention but which is described in our co-pending European patent application No. 82106409, which corresponds to U.S. Pat. No. 4,399,746 issued Aug. 23, 1983. Upwardly extending runs 46, 48 of the belts 42 define a bale-forming chamber 50, the ends of which are provided by the sidewalls 14 and gate 34 and which has an inlet 52 for crop received from a pickup 54 beneath it.

In order to accommodate the increasing diameter of a growing bale core in the bale-forming chamber 50, the size of the chamber must also increase and a belt take-up and tensioning mechanism is provided at either side of the machine. These mechanisms are joined together by a horizontal transverse shaft 56 mounted at the forward end of the main frame for pivoting about a horizontal transverse axis and include: a pair of rearwardly extending idler arms which are mounted rigidly at their forward to the horizontal transverse shaft 56 thereby providing a pivot connection for the arms, and of which the right-hand arm 58 only is shown; the belt take-up roll 40 which is supported at either end at an intermediate location on the arms 58; and the pair of chamber restricting rolls 36, 38 supported at the free ends of the arms. Upward movement of the arms is uieldably resisted by a pair of springs, one on either side of the main frame 10, of which only the right-hand spring 60 is shown and only its arrangement will be described, the other being similar. The spring 60 is connected at its lower end by a post 62 to a lever portion 64 of the arm 58, the portion 64 being rigid with the pivot shaft 56. The upper end of the spring 60 is connected to one arm of a bell crank 65, the other arm of which bears one end of the take-up roll 41. The lever portion 64 is also pivotally connected to the cylinder of a piston and cylinder unit 66 of which the piston is in turn pivotally connected to the gate 34 at a point 67, a similar arrangement being provided also on the left-hand side of the machine.

The piston and cylinder unit 66 has two functions the first of which is in relation to the idler arm 58 and bale formation, and the second of which is to open and close the gate 34 and to maintain it closed. The lever portion 64 has at its free end a piston and cylinder unit connection point 68, at the same horizontal level as the point 67, to which the unit 66 is to be connected to offer maximum resistance to upward pivotal movement of the idler arm 58 when baling in normal conditions. However, a further connection point 70, located very close to the pivot shaft 56, is also provided on the lever portion 64 and is to be selected when the machine is used for baling hay which is not sufficiently dry. This latter connection point 70 lies, of course, on the longitudinal axis 71 of the unit 66, and this is at an angle of nine degrees to the horizontal before baling starts as shown in FIG. 1. The longitudinal axis 71 is more importantly also at an angle of three degrees to a geometric line joining the pivot connections 67 and 56, but for reason of clarity difficulties this is not illustrated in the drawings. Thus, the longitudinal axis 71 of the unit 66 is sufficiently close to the intersecting pivot axis of the idler arm 58 that the resistance offered by the unit to upward pivotal movement of the arm about the pivot axis is substantially zero or close to zero. The significance of this will be explained when the baling operation is described later below.

In addition to being connected to the piston and cylinder unit 66, the lever portion 64 is also pivotally attached at its inward face to a subsidiary piston and cylinder unit 72 which serves to bring about displacement of the idler arm 58 if it is desired to open the gate 34 when the baling chamber 50 is empty. The subsidiary unit 72 is connected to the free end of the lever portion 64 at the same point 68 as can be used, as mentioned above, simultaneously for the piston and cylinder unit 66.

Figure 2:
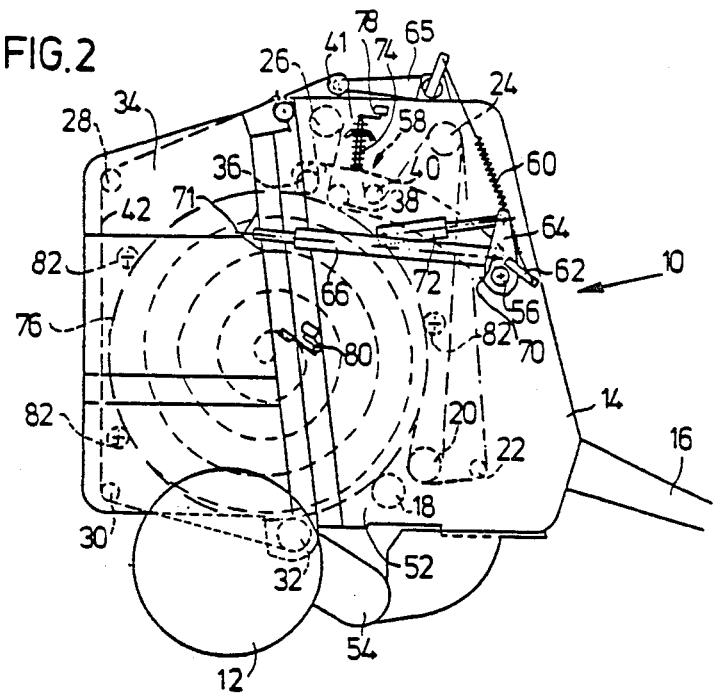
FIG. 2 shows the machine of FIG. 1 at the stage of completion of baling when a bale is at its maximum size.
Figure 3:
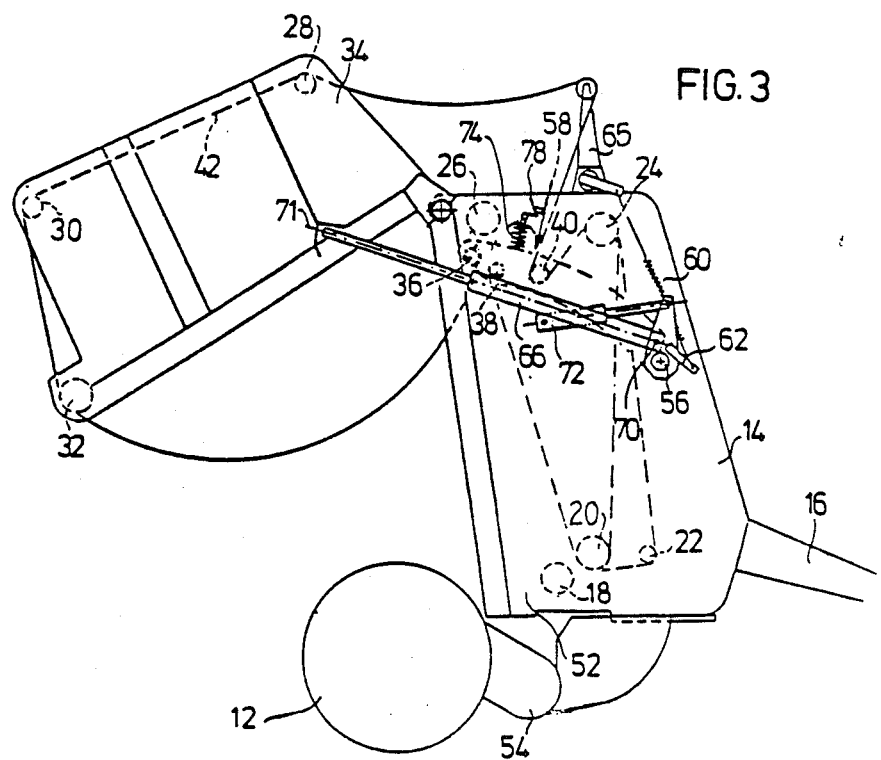
FIG. 3 shows the machine of FIG. 1 with its gate fully open after bale discharge.

An idler arm spring-loaded stop 74 is attached to either sidewall 14 at an upper portion thereof at a position corresponding to the maximum swing of the arm 58 and related to the maximum size of a bale 76. A switch 78, electrically connected to an indicator for the operator, can be provided just above the stop 74 to be triggered by it when the maximum swing is reached. Alternatively, a gate switch 80 which is shown only in FIG. 2 can be disposed between the gate 34 and the wall 14. This switch 80 similarly is electrically connected to an indicator, and the switch 80 will be triggered when the gate 34 begins slightly to be forced open. The indicators are not shown. Furthermore, three fixed-position rolls 82 which are illustrated only in FIG. 2 are disposed around the maximum circumference of the bale 76 so as to support the belts 42 in order to keep the bale cylindrical.

In operation, hay lying in a windrow is lifted and conveyed to the baling chamber 50 where the oppositely moving runs 46, 48 of the belts 42 cause the crop to turn clockwise (as viewed in the FIGS.) so as to form a bale core of increasing size which eventually overcomes the tension in the belts brought about by the belt take-up and tensioning mechanisms, and the idler arms 58 consequently swing upwardly and thus the chamber 50 increases in size.

In wet conditions a bale with a soft core, but still with a dense outer shell, may be required and the piston and cylinder unit 66 is then attached as already described to the connection point 70 on the lever portion 64. The effect of this is that the resistance applied to upward pivotal movement of the idler arm 58 by the unit 66 during formation of the growing bale, i.e., the bale core, is insignificant and hence the core will be soft since only the spring 60 will be offering any significant resistance to such movement of the idler arm 58. The density of the bale remains low until the idler arms 58 abut the spring-loaded stops 74 when the baler starts to operate as a machine with a fixed size chamber and therefore the density of the outer layers increases at this stage of bale formation. Finally the spring loading of the stops 74 will be overcome and they will move against, and trigger, the switches 78 indicating to the operator the completion of the formation of the bale 76.

The tying of the bale 76 and its ejection through the gate 34 are conventional and therefore will not be described.

In normal harvesting conditions the piston and cylinder unit 66 will be attached to the connection point 68 on the lever portion 64 so that the unit 66 and the spring 60 will act together to provide maximum resistance to upward pivotal movement of the idler arm 58 during formation of the core which will then achieve maximum density.

The baling machine is thus well adapted to producing as needed either a bale which is dense throughout or a bale which has a soft core and dense outer layers. At the same time, even when a soft core bale is being produced, the piston and cylinder units 66 will be capable of maintaining the gate 34 in its closed condition and will be able to open and close the gate on completion of a bale.

I claim:

1. In a baling machine for forming cylindrical bales, including a main frame having a pair of upright, fore-and-aft extending transversely spaced sidewalls, a bale discharge gate vertically pivotally connected to an upper rear location of said sidewalls for movement between open and closed positions and including opposite sidewalls respectively forming rearward continuations of the main frame sidewalls when the gate is in its closed position, a pair of fore-and-aft extending transversely spaced idler arms having their forward ends fixed to a horizontal transverse shaft having opposite ends respectively pivotally mounted in the main frame opposite sidewalls, a plurality of belt support rolls extending horizontally between and being rotatably supported in the sidewalls of both the main frame and gate, at least one belt take-up roll extending between and being rotatably mounted in said pair of idler arms, a plurality of belts supported in side-by-side relationship on the support and idler rolls and cooperating with the sidewalls of the main frame and gate to define an expansible baling chamber being of minimum and maximum size respectively when the idler arms are in fully lowered and fully raised positions, at least one lever fixed to said transverse shaft, and a hydraulic piston and cylinder unit having opposite ends respectively pivotally connected to the gate and lever by first and second pivot connections, the improvement comprising: spring biasing means coupled to said lever and exerting a force thereon resisting movement of the idler arms from their lowered position; said lever having at least first and second connection points spaced therealong and alternately cooperating to form the second pivot connection of said unit; and said first and second connection points being so located relative to the first pivot connection and shaft that when the idler arms are in their fully lowered positions a maximum resistance to raising of the arms is effected by the unit when said first connection point cooperates to form the second pivot connection, whereby the unit and spring biasing means cooperate to resist raising of the arms, and approximately zero resistance to raising of the arms is effected by the unit when said second connection point cooperates to form the second pivot connection, whereby only the spring biasing means acts to resist raising of the arms.

2. The baling machine defined in claim 1 wherein the piston and cylinder unit has a longitudinal axis passing through the first and second pivot connections and said axis making an angle of no more than about three degrees with a geometric line extending between a longitudinal axis of the shaft and the first pivot connection.

3. The baling machine defined in claim 1 and further including a resiliently yieldable abutment means mounted to the main frame in the path of movement of at least one of said idler arms for engagement by the latter as it approaches its fully raised position whereby additional resistance to upward movement of said arms will be effected by the abutment means to thereby increase the density of an outer portion of a bale being formed in the chamber.

4. The baling machine defined in claim 1 and further including an auxiliary cylinder and piston unit connected between the main frame and the first connection point and operable to swing the arms to their raised position and thus control their movement when it is desired to operate the first named unit to open the gate when the baling chamber is empty.

* * * * *